Jan. 5, 1965   W. N. FOY   3,164,257
FOOD CARRIER
Filed May 3, 1963
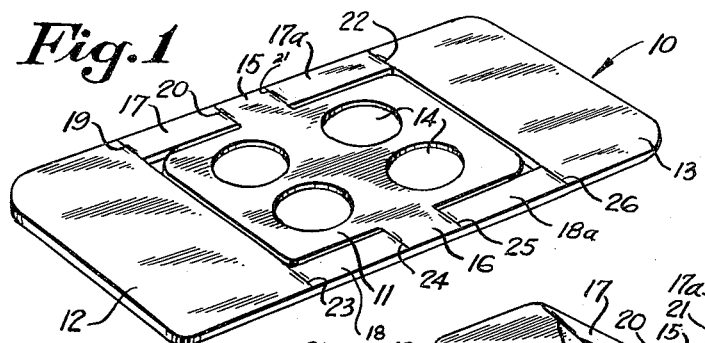
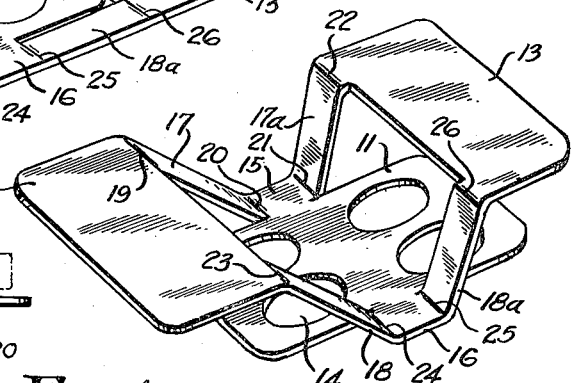
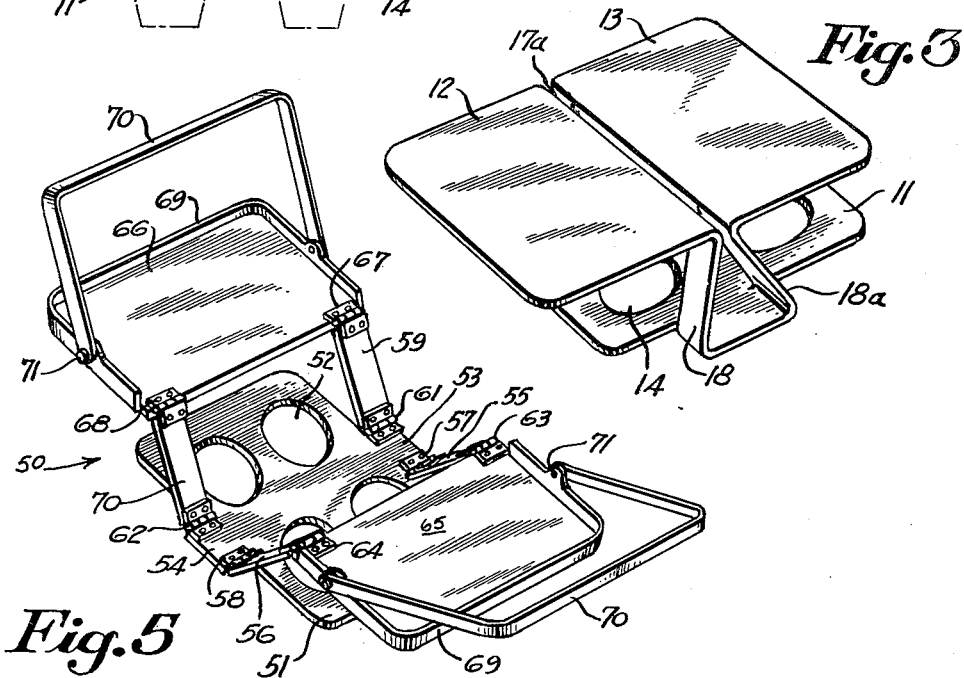
INVENTOR.
WILLIAM N. FOY
BY Richards & Geier
ATTORNEYS

United States Patent Office 3,164,257
Patented Jan. 5, 1965

3,164,257
FOOD CARRIER
William N. Foy, 369 Decatur St., Brooklyn, N.Y.
Filed May 3, 1963, Ser. No. 277,751
3 Claims. (Cl. 211—74)

This invention relates to a food carrier and refers more particularly to a portable carrier with which a person may carry a quantity of beverages and sandwiches.

It is common for persons attending sporting events, conventions, assemblies, etc. to refresh themselves with food during the course of the event they are attending. It is also a common practice for one person to go to a refreshment stand and make the purchases for himself and several others. The amount of food one person can conveniently carry is limited, particularly with regard to beverage containers. Thus to avoid spillage, the purchaser may be required to make several trips to the refreshment stand to complete his purchases. In addition, carrying beverage containers such as paper cups is sometimes bothersome from the aspect of accidentally spilling the contents on other persons attending the event. The latter is particularly apparent at sports stadium where large crowds of people are sometimes gathered together in confined seating arrangements.

It is, therefore, the primary object of the present invention to provide a food carrier which in use enables a person to carry a quantity of beverage containers and other items of food such as sandwiches, cakes, etc.

Another object is to provide a food carrier which is not bulky in size or shape and thus lends itself for easy storage at refreshment stands and the like.

Still another object is to provide a food carrier which is of one piece construction and which may be folded into a carrying position with ease and facility.

Another object is to provide a food carrier which is of sturdy construction while at the same time is simple and economical to make.

Other objects of the present invention will become apparent in the course of the following specification.

In achieving the aforementioned objectives of the present invention, it was found advantageous to provide a food carrier which comprises a flat elongated panel which has a central portion containing a number of openings for receiving beverage containers. The terminal portions of the panel are connected with the central portion by means of extensions extending transversely of the central portion at each side. They are otherwise unconnected with but extend in close abutting relation with the perimetrical edges of the central portion. The terminal portions which each have a wide surface, are foldable inwardly and upwardly relatively to the central portion so that they may be folded to an operative abutting position above the central portion where they constitute a substantially flat supporting surface for sandwiches and the like.

The invention will appear more clearly from the following detailed description when taken in conjunction with the accompanying drawings showing, by way of example, preferred embodiments of the inventive concept.

In the drawings:

FIGURE 1 is a perspective view of a food carrier constructed in accordance with the principles of the present invention, the carrier being shown in an unfolded or non-use position.

FIGURE 2 is a perspective view of the food carrier in a partly folded-up position.

FIGURE 3 is a perspective view of the food carrier in a fully folded-up or use position.

FIGURE 4 is a side elevational view of the food carrier in a folded up position and illustrates the manner in which the carrier is used for carrying the beverage containers and food.

FIGURE 5 is a perspective view of another form of the food carrier of the present invention.

Throughout the specification, like reference numerals are used to indicate like parts.

Referring to FIGURE 1 of the drawing, the food carrier 10 comprises an elongated panel which has a central portion 11 and terminal or tray portions 12 and 13. Central portion 11 is provided with a number of openings 14 for supporting beverage containers such as paper cups and the like. Central portion 11 has at each side, transversely directed extensions 15 and 16 which, respectively, are integral with longitudinally directed support flaps 17, 17a and 18, 18a. Support flaps 17 and 18 are in turn integral with terminal tray portion 12 of the panel and support flaps 17a and 18a are integral with terminal tray portion 13 of the panel. The perimetrical edges of central portion 11 are, therefore, unconnected with the terminal tray portions 12 and 13 except for the transverse extensions 15 and 16. The food carrier 10 is preferably made from a single piece of material as, for example, cardboard. In this manner, the openings 14 and separation of the perimeter of central portion 11 from the terminal tray portions may be easily effected.

Referring once again to FIGURE 1, the panel is provided with a number of fold lines 19–26, the reasons for which will become apparent later on the specification.

A more complete understanding of the food carrier of the present invention will be had by describing the manner in which the food carrier is used. Assume that a patron at a sporting event or picnic goes to a refreshment stand to obtain a number of drinks and sandwiches. Further, assume that a quantity of food carriers 10, as shown in the unfolded position of FIGURE 1, are located conveniently in a stack at the refreshment stand. The patron will on making his purchases, select a food carrier from the stack. He will lay the food carrier 10 flat on the counter of the refreshment stand. He will then locate any beverage containers he wishes to carry in the openings 14 of central portion 11. Four openings 14 are shown by way of example, but it is possible to provide the food carrier with six, eight or even more openings if desirable. The patron will then lift the terminal or tray portions 12 and 13 with an upwardly and inwardly motion, so they will start to assume the positions shown in FIGURE 2. The support flaps 17 and 17a, 18 and 18a will swing upwardly and inwardly of central portion 11 bending at the fold lines 20, 24, 21 and 25. At the same time, a bending force is applied to the terminal or tray portions 12 and 13 so as to cause them to bend relatively to the support flaps at fold lines 19, 23, 22 and 26 with the tray portions being maintained substantially parallel with central portion 11. The tray portions 12 and 13 are then brought together in the abutting position shown in FIGURE 3 in which position the food carrier is in its folded-up or use position, with the tray portions being spaced a distance above the central portion 11 and constituting a substantially flat supporting surface for supporting sandwiches, cakes, etc. The tray portions 12 and 13 are maintained in the folded-up position by the patron grasping the supporting flaps (18 and 18a for example) at one side of the food carrier and holding them together in the position shown in FIGURE 4. The patron then lifts the food carrier vertically until the openings 14 in central portion 11 engage the beverage containers 30 (FIG. 4). He then places sandwiches, cakes 31, etc. on the supporting trays 12 and 13 and he then may proceed to his seat carrying all the purchases simply and securely with little chance of spilling beverage from the containers 30.

It is also possible to utilize the food carrier as a tray, as for example, when the patron returns to his seat and no table is available on which to support the refreshments, which may be the case at a sports stadium. This may be done by placing the tray portions 12 and 13 on the person's legs when he is seated with central portion 11 being located between the legs. The position of the food carrier in this use is comparable to that shown in FIGURE 1. The person may then return the beverage container to one of the openings 14 after he takes a drink, etc.

FIGURE 5 illustrates another form 50 of the food carrier. This embodiment is intended to be of a durable or re-usable nature. For that reason it is preferably made of plastic, wood, lightweight metal, etc. The food carrier 50 has a central portion 51 which is provided with holes 52 for receiving beverage containers, and transverse extensions 53 and 54. Support arms 55 and 56 are swingably connected at one end with one side of transverse extensions 53 and 54, respectively, by means of hinges 57 and 58. Support arms 59 and 60 are swingably connected at one end with the other side of extensions 53 and 54, respectively, by means of hinges 61 and 62. The other ends of support arms 55 and 56 are connected by means of hinges 63 and 64, respectively, with tray portion 65. Likewise, tray portion 66 is connected with support arms 59 and 60 by means of hinges 67 and 68, respectively.

Tray portions 65 and 66 are each provided with a retainer lip 69 which is slightly inclined outwardly of the tray portions and extends around three sides of the periphery of each tray portion. The retainer lip acts to prevent sandwiches, cakes, etc., from sliding off the tray portion when in use.

To facilitate carrying the food carrier, the tray portions are provided with handles 70 which are connected to the tray portions by means of pivots 71.

In use, the food carrier is used in the same manner as food carrier 10 as previously described. In use, the handles 71 may be crossed one over the other with the tray portions in the folded-up position. In this manner, the tray portions will be maintained in an abutting relation.

It is also possible and indeed preferable to provide food carrier 10 with a retainer lip similar to that (69) shown in food carrier 50. Likewise handles can be provided for each of the tray portions 12 and 13.

It is apparent that the food carrier of the present invention offers the advantage of being simple in construction, easy to use and suited for carrying food and beverages with security. Furthermore, it is particularly suited for use at ball parks, concerts, picnics, etc.

While there is above disclosed but some embodiments of the food carrier, it is possible to produce still other embodiments without departing from the scope of the inventive concept herein disclosed.

What is claimed is:

1. A food carrier comprising a panel having a central portion, said central portion having openings for receiving articles, a pair of hinge members swingably connected at one end to opposite sides of said central portion and extending in opposite directions, and tray portions located at each end of said central portion and swingably connected to the other ends of said hinge members, said tray portions being swingable from a first position wherein it is in planar alignment with said central portion to a second position parallel spaced a distance above said central portion, each of said tray portions having a handle, said handle being pivoted to said tray portion at opposite sides thereof.

2. A food carrier comprising an elongated panel having a central portion, said central portion having a plurality of openings for receiving articles and tongue-shaped extensions having parallel margins extending transversely outwardly of said central portion at each side, a pair of hinge members swingably connected at one end to the margins of each of said extensions and extending longitudinally of said central portion in opposite directions, and tray portions located in planar alignment with said central portion at each end thereof and being swingably connected to the other ends of said hinge members, said tray portions being swingable from their aligned positions alongside said central portion to a position parallel spaced a distance above said central portion.

3. A food carrier comprising an elongated panel having a central portion, said central portion having a plurality of openings for receiving articles and tongue-shaped extensions having parallel margins extending transversely outwardly of said central portion at each side, said extensions being arranged symmetrically relatively to the transverse axis of said central portion, a pair of hinge members swingably connected at one end to the margins of each of said extensions and extending longitudinally of said central portion in opposite directions, and substantially flat tray portions located in planar alignment with said central portion at each end thereof and being swingably connected to the other ends of one of each of said pair of hinge members, said tray portions being swingable from their aligned positions alongside said central portion to a position parallel spaced a distance above said central portion with said tray portions being arranged in planar, abutting alignment.

References Cited in the file of this patent

UNITED STATES PATENTS

| | | |
|---|---|---|
| 903,078 | Gianini | Nov. 3, 1908 |
| 1,140,540 | Smith | May 25, 1915 |